United States Patent
Yanagisawa et al.

(10) Patent No.: US 6,407,731 B2
(45) Date of Patent: *Jun. 18, 2002

(54) VIBRATION-TRANSMITTING TABLET AND COORDINATES INPUT APPARATUS

(75) Inventors: Ryozo Yanagisawa, Inzai; Atsushi Tanaka, Yamato; Yuichiro Yoshimura, Kamakura; Katsuyuki Kobayashi; Hajime Sato, both of Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/045,686

(22) Filed: Mar. 23, 1998

(30) Foreign Application Priority Data

Mar. 24, 1997 (JP) .............................. 9-070117

(51) Int. Cl.$^7$ ................................ G09G 5/00
(52) U.S. Cl. .................... 345/177; 345/179; 178/18.03; 178/18.04; 178/19.01; 178/19.02
(58) Field of Search .......................... 178/18.04, 19.01, 178/19.02, 18.03; 345/177, 179, 176, 173

(56) References Cited

U.S. PATENT DOCUMENTS 4,980,518 A * 12/1990 Kobayashi et al. ........... 178/18
5,491,395 A * 2/1996 Kawakami et al. .......... 178/19

FOREIGN PATENT DOCUMENTS

JP 7-160407 6/1995

* cited by examiner

Primary Examiner—Steven Saras
Assistant Examiner—Uchendu O. Anyaso
(74) Attorney, Agent, or Firm—Fitzpatrick, Cella, Harper & Scinto (57) ABSTRACT

A coordinates input apparatus which detects vibration, inputted by a vibration-input pen, by a plurality of vibration sensors provided on a vibration-transmitting tablet, and derives coordinates of a vibration-input point based on vibration transmitting time on the vibration-transmitting tablet. The vibration-transmitting tablet comprises a glass substrate and two sheets of resinous film laminated on the glass substrate. The two sheets of resinous film are laminated on both surfaces of the glass substrate in an orientation such that the stretched directions of the resinous film differ for 90 degrees. By this, a vibration-transmitting tablet where sheets of protection film are laminated, and a coordinates input apparatus which minimizes the changes in vibration propagation velocity depending on the propagation directions, are realized.

14 Claims, 7 Drawing Sheets

VIBRATION-TRANSMITTING TABLET AND COORDINATES INPUT APPARATUS

BACKGROUND OF THE INVENTION

The present invention relates to a coordinates input apparatus. More particularly, the present invention relates to a coordinates input apparatus which detects elastic-wave vibration inputted to a vibration-transmitting tablet by vibration-input means, and obtains coordinates of the vibration-input point inputted by the vibration-input means based on the delay time of propagation of the elastic-wave vibration inputted to the vibration-transmitting tablet by the vibration-input means, and also relates to the vibration-transmitting tablet employed by the coordinates input apparatus.

A coordinates input apparatus employing an ultrasonic wave method calculates coordinates of a position by determining the delay time of a wave propagated on a tablet which serves as an input surface. According to the ultrasonic wave method, since no work has been done on the tablet such as matrix wiring or the like, it is possible to provide an inexpensive coordinates input apparatus. In addition, by using a transparent plate glass for a tablet, it is possible to provide a coordinates input apparatus having higher transparency as compared to apparatuses using other methods. In the coordinates input apparatus of this type, vibration applied to the vibration-transmitting tablet by a vibration-input pen is detected by a vibration sensor, and time difference between the vibration-applied time and vibration-detected time is calculated. By this, the distance from the vibration-applied point to the vibration sensor is calculated and a coordinates value of the vibration-applied point is obtained.

In a case where a glass plate is utilized as the vibration-transmitting tablet as mentioned above, the vibration-transmitting tablet can be broken by a strong impact load or extreme static pressure load. Therefore, in order to prevent injury of an operator, in case the glass plate is broken, one of the front surface (input side) or back surface of the vibration-transmitting tablet is laminated with resinous film. By virtue of the lamination, even in a case where the glass plate is broken, the operator does not have the risk of directly touching the broken glass plate, thus injury can be prevented. Moreover, the lamination has an effect of preventing scattering of broken pieces of glass. Film used for such lamination is not limited to a particular material; however, the film must adopt a material and thickness so that the film is not torn or split by pieces of broken glass plate.

As described above, the resinous film, used for laminating the glass plate for preventing scattering of broken pieces of glass in case the glass is broken, has a thickness such that the film is not torn or split by a piece of broken glass. Therefore, the film is uniaxially or biaxially stretched for improving mechanical strength. Because of the stretching processing, the film of this type has different mechanical characteristics depending on directions of the film. For instance, the elasticity (Young's modulus), tensile strength, elongation and the like are different in the film rolled direction and the rolling axle direction orthogonal to the film rolled direction.

Vibration used in the coordinates input apparatus, employing an ultrasonic wave method, is a plate wave, and particularly, the vibration detected by the aforementioned vibration sensor is vibration in the Ao mode of the Lamb wave of a plate wave. The plate wave differs in its vibration propagation velocity (group velocity and phase velocity) depending upon the material characteristics (Young's modulus, Poisson's ratio and specific gravity) and thickness of the vibration-transmitting tablet, as well as the frequency of the vibration itself. In the case of the above-described vibration-transmitting tablet where a resinous film is laminated on the glass plate, vibration propagates on the plate which utilizes the combination of the glass plate having relatively fast propagation velocity and the resin having relatively slow propagation velocity. Therefore, the vibration propagation velocity on the vibration-transmitting tablet is slower than that on the glass plate. Furthermore, since the mechanical characteristics are different depending on which direction the film is stretched, a problem arises in that vibration propagation velocity differs depending on the directions. In other words, in a case where a film is laminated on a glass plate, the degree of slowing down the propagation velocity differs depending on directions of the film.

Figure 1:
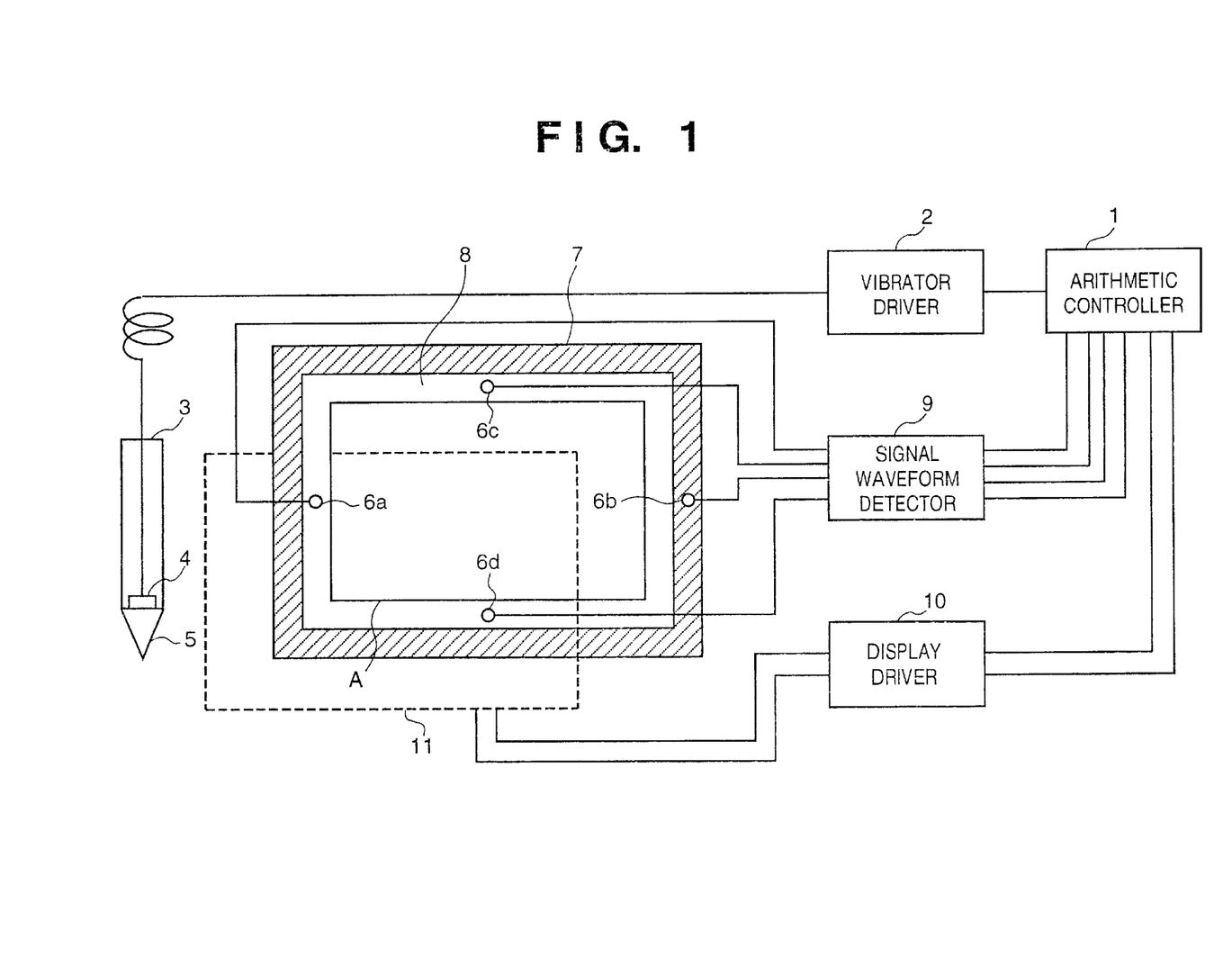
FIG. 1 is a block diagram schematically showing the construction of a coordinates input apparatus according to the present embodiment, which employs the ultrasonic wave method.

Moreover, for instance, in a case where vibration sensors are provided at positions 6a to 6d as shown in FIG. 1, the vibration sensors 6a and 6b detect vibration arriving from the vertical range of 180 degrees, and the vibration sensors 6c and 6d detect vibration arriving from the horizontal range of 180 degrees. Therefore, depending on a vibration-input point, the group velocity and phase velocity of the propagated plate wave become different values. As a result, a problem arises in that the actual vibration propagation velocity is different from a predetermined propagation velocity (group velocity and phase velocity) which has been set to calculate the distance. This causes an error when calculating the distance between the vibration-input pen and vibration sensor, consequently resulting in deterioration in precision of coordinates detection.

SUMMARY OF THE INVENTION

The present invention has been made in consideration of the above situation, and has as its object to provide a vibration-transmitting tablet, on which a protection film is laminated, which can minimize the changes in vibration propagation velocity in different directions of vibration propagation, and a coordinates input apparatus utilizing the vibration-transmitting tablet.

Another object of the present invention is to laminate a plurality of sheets of film on the vibration-transmitting tablet in such manner that the plurality of sheets of film can compensate influences over vibration propagation velocity, or such that influences over vibration propagation velocity are made equal in all directions, thereby satisfying the protection function and providing a vibration-transmitting tablet and coordinates input apparatus which can perform coordinates detection with high precision.

In order to attain the above objects, the vibration-transmitting tablet according to an embodiment of the present invention has the following configuration.

More specifically, the present invention provides a vibration-transmitting tablet for propagating inputted vibration, comprising: a substrate; and a plurality of films laminated on the substrate, wherein each of the plurality of films are laminated in an orientation such that the velocity of propagation of vibration in the axial direction are different from each other.

Furthermore, in order to attain the above objects, the coordinates input apparatus according to an embodiment of the present invention has the following configuration.

More specifically, the present invention provides a coordinates input apparatus for detecting vibration, inputted by vibration-input means, by a plurality of vibration sensors provided on a vibration-transmitting tablet, and deriving coordinates of a vibration-input point based on vibration transmitting time on the vibration-transmitting tablet, the vibration-transmitting tablet comprising: a substrate; and a plurality of films laminated on the substrate, wherein the plurality of films are laminated such that the velocity of propagation of vibration in the axial direction are different from each other.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENT

Preferred embodiment of the present invention will be described in detail in accordance with the accompanying drawings.

<Construction of Coordinates Input Apparatus (FIGS. 1 and 2)>

FIG. 1 is a block diagram schematically showing the construction of a coordinates input apparatus according to the present embodiment, which employs the ultrasonic wave method. In FIG. 1, reference numeral 1 denotes an arithmetic controller which controls the entire apparatus and calculates a coordinates position. Reference numeral 2 denotes a vibrator driver which drives a vibrator 4 included in a vibration-input pen 3 to vibrate a pen point 5. Reference numeral 8 denotes a vibration-transmitting tablet structured with a transparent glass plate and protection film. The coordinates input is performed by touching on the vibration-transmitting tablet 8 by the vibration-input pen 3. The area A indicated by the solid line in FIG. 1 indicates a coordinates-input effective area. By designating a position within the effective area with the vibration-input pen 3, the coordinates of the position of the vibration-input pen 3 is calculated.

Vibration sensors 6a to 6d, e.g. a piezoelectric device and the like, which converts mechanical vibration into electric signals, are fixed outside the effective area at the center of each side of the effective area A. Moreover, in order to prevent (minimize) propagated waves from being reflected on the end surface of the vibration-transmitting tablet 8 and returned to the center portion, a vibration suppresser 7 is provided in the periphery of the vibration-transmitting tablet 8.

Reference numeral 9 denotes a signal waveform detector which outputs a vibration-arrival timing signal, indicative of arrival of vibration, to the arithmetic controller 1 based on the signal detected by each of the vibration sensors 6a to 6d. Reference numeral 11 denotes a display capable of displaying per dot, e.g. a liquid crystal display or the like, and the display is situated behind the vibration-transmitting tablet. By driving a display driver 10, a dot is displayed at a position designated by the vibration-input pen 3 (i.e., the position designated by a detected coordinates value). An image displayed on the display 11 can be seen through the vibration-transmitting tablet 8.

Figure 2:
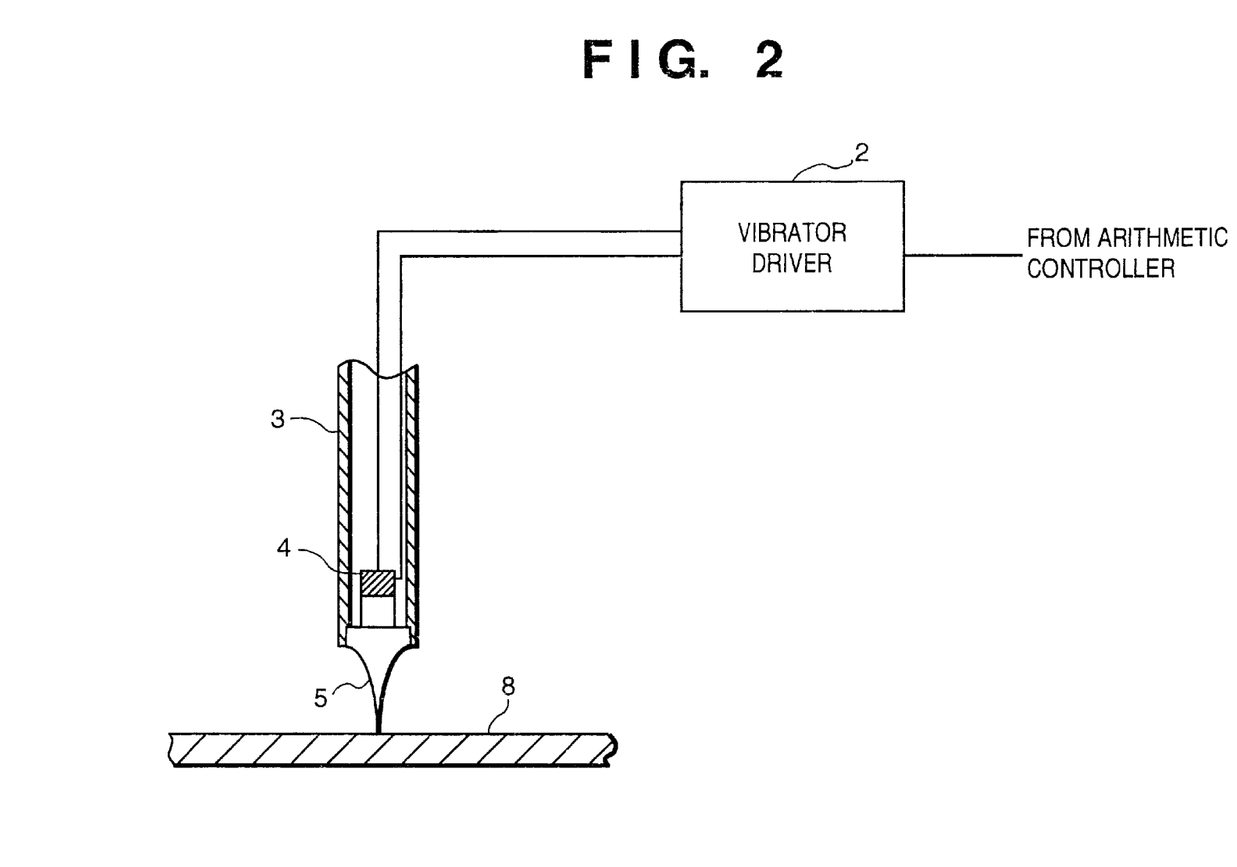
FIG. 2 is a block diagram showing the construction of a vibration-input pen.

FIG. 2 is a block diagram showing the construction of the vibration-input pen 3. The vibrator 4 included in the vibration-input pen 3 is driven by the vibrator driver 2. A drive signal for the vibrator 4 is supplied by the arithmetic controller 1 as a pulse signal at a low-voltage level, then amplified by the vibrator driver 2 with a predetermined gain and applied to the vibrator 4. The electric drive signal is converted by the vibrator 4 into mechanical vibration and transmitted to the vibration-transmitting table 8 via the pen point 5.

Herein, the value of a vibration frequency of the vibrator 4 is selected so as to generate a plate wave on the vibration-transmitting tablet 8 such as a glass plate. For driving the vibrator 4, a mode is selected such that vibration is generated on the vibration-transmitting tablet 8 in the vertical direction in FIG. 2. Moreover, efficient vibration conversion is possible if the vibration frequency of the vibrator 4 is set at a resonance frequency including the pen point 5. The elastic wave generated on the vibration-transmitting tablet 8 as described above is a plate wave which is not easily influenced by scratches or foreign materials on the surface of the vibration-transmitting tablet, contrary to a surface wave.

<Arithmetic Controller (FIG. 3)>

In the above-described construction, the arithmetic controller 1 sends a signal to the vibrator driver 2 at predetermined intervals (e.g. every 5 msec.) so as to make the vibrator driver 2 output a drive signal for the vibrator 4 in the vibration-input pen 3, and start clocking the time by using a timer (comprising a counter). The vibration inputted by the vibration-input pen 3 is propagated on the vibration-transmitting tablet 8 and arrives at the vibration sensors 6a to 6d with delays in accordance with the respective distances from the vibration input position.

The signal waveform detector 9 detects signals sensed by each of the vibration sensors 6a to 6d, and generates signals, indicative of respective vibration-arrival timing at each of the vibration sensors 6a to 6d, by waveform detection processing which will be described later. The arithmetic controller 1 inputs the signals for each sensor and determines vibration transmission time from the point of vibration-input to the points of arrival of the vibration at the respective vibration sensors 6a to 6d. Based on the determined vibration transmission time, the position of the input of the vibration-input pen 3 is calculated. Based on the position information of the vibration-input pen 3, the display driver 10 is driven to control the display operation of the display 11, or the coordinates value is outputted to an external apparatus by serial or parallel communication.

Figure 3:
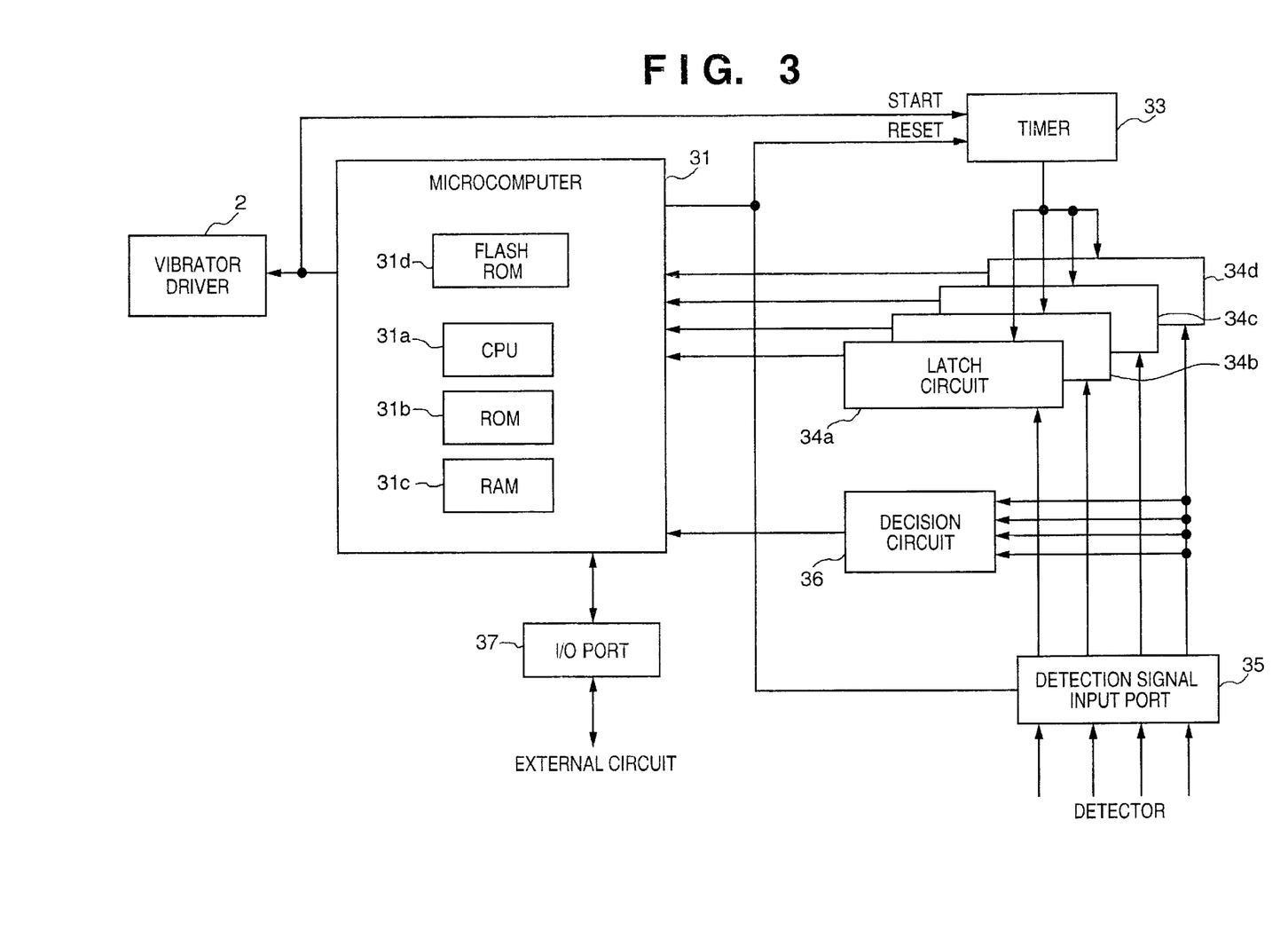
FIG. 3 is a block diagram showing the construction of an arithmetic controller.

FIG. 3 is a block diagram showing the construction of the arithmetic controller 1. Hereinafter, respective elements of the arithmetic controller 1 and the operation of the components will be described.

In FIG. 3, reference numeral 31 denotes a microcomputer which controls the arithmetic controller 1 and the entire coordinates input apparatus. The microcomputer 31 comprises a CPU 31a which performs various controls according to control programs, an internal counter (not shown), a ROM 31b storing control programs and the like to be executed by the CPU 31a, a RAM 31c used as a work area for the CPU 31a to execute various processing, and a non-volatile memory (in the present embodiment, flash ROM 31d) for storing constants and the like. Reference numeral 33 denotes a timer (comprising a counter, for instance) for clocking time using a reference clock (not shown). When the vibrator driver 2 receives a start signal to start driving the vibrator 4 in the vibration-input pen 3, time clocking using the reference clock is started. This synchronizes the timing of the start of time clocking and the vibration input by the vibration-input pen, enabling calculation of the delay time between the input of vibration and detection of vibration by the sensors 6a to 6d. Other circuits which are components of the apparatus will be described later.

The signal waveform detector 9 outputs vibration-arrival timing signals based on a signal from each of the vibration sensors 6a to 6d, and the timing signals are inputted to the latch circuits 34a to 34d via a detection signal input port 35. The latch circuits 34a to 34d respectively correspond to the vibration sensors 6a to 6d. When one of the latch circuits receives timing signals from a corresponding sensor, the clocked time value of the timer 33 at that time is latched. When a decision circuit 36 determines that all detection signals have been received, the decision circuit 36 outputs a signal indicative of the determination to the microcomputer 31. When the microcomputer 31 receives the signal from the decision circuit 36, the microcomputer 31 reads each of the clocked time values out of the latch circuits 34a to 34d. These clocked time values respectively indicate the vibration transmission time to the vibration sensors 6a to 6d. The microcomputer 31 performs a predetermined calculation using the clocked time values read out of the latch circuits, and obtains coordinates of the vibration-input position of the vibration-input pen 3 on the vibration-transmitting tablet 8. By outputting the obtained coordinates information to the display driver 10 via an I/O port 37, dots or the like are displayed at the corresponding positions of the display 11. Alternately, by outputting the coordinates information to an interface unit via the I/O port 37, the coordinates value is outputted to an external apparatus.

<Determining Vibration Transmission Time (FIGS. 4 and 5)>

Next, description will be provided on the theory of clocking the vibration transmission time from the point of vibration-input by the vibration-input pen 3 to the points of vibration arrival at the vibration sensors 6a to 6d.

Figure 4:
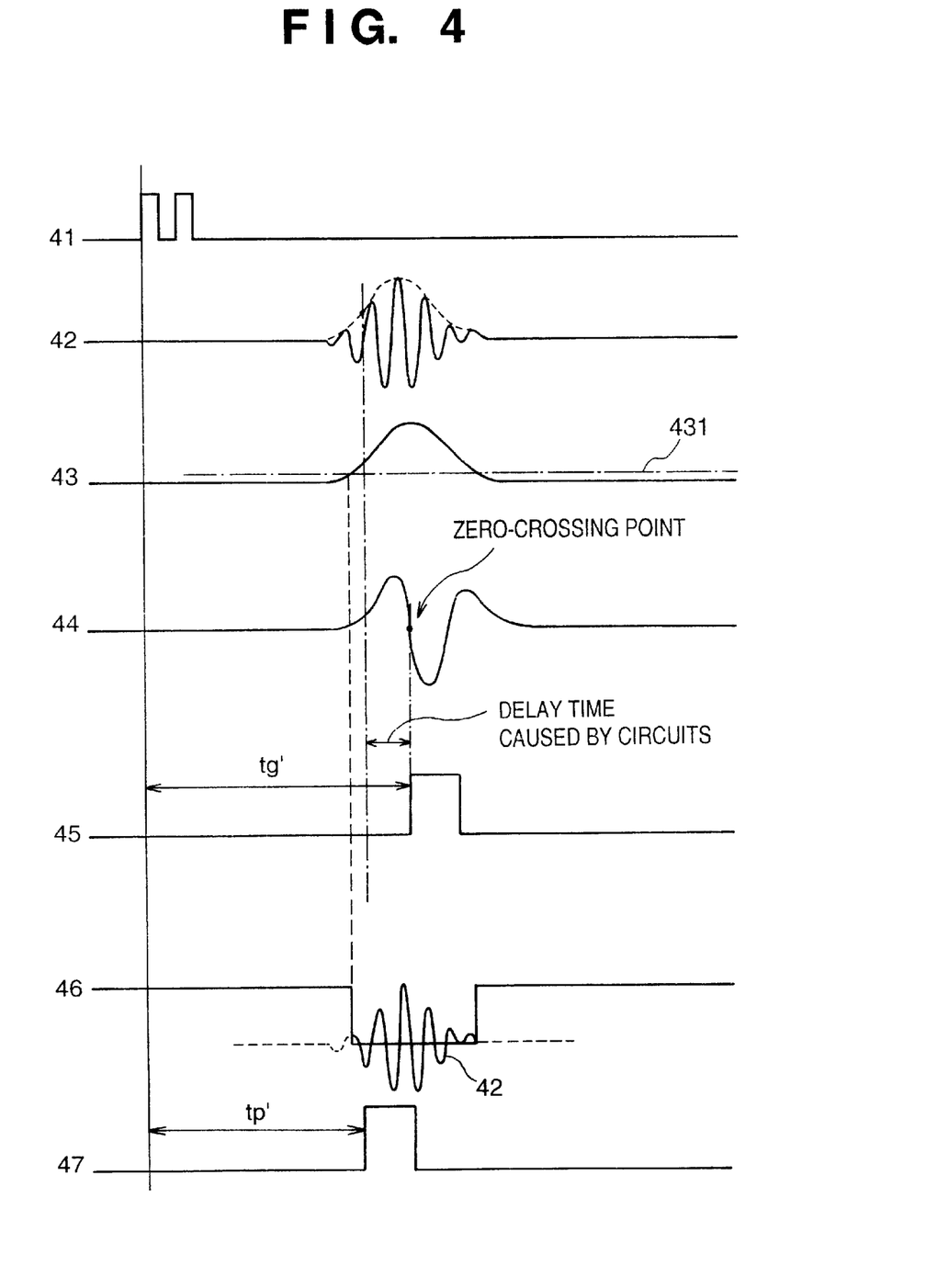
FIG. 4 is a timing chart for explaining detected waveforms inputted to a signal waveform detector 9 and the processing to generate vibration-arrival timing signals based on the waveforms.

FIG. 4 is a timing chart for explaining detected waveforms inputted to a signal waveform detector 9 and the processing to generate vibration-arrival timing signals based on the waveforms. Note that although the description below is provided with respect to the vibration sensor 6a, vibration-arrival timing signals are generated similarly by other vibration sensors 6b, 6c and 6d.

As has been mentioned above, the start of clocking the vibration transmission time from the point of vibration-input to the point of vibration-detection at the vibration sensor 6a is the same timing as outputting the drive signal to the vibration driver 2. At this time, the vibrator driver 2 applies a drive signal 41 to the vibrator 4. In accordance with the drive signal 41, ultrasonic wave vibration which is transmitted from the vibration-input pen 3 to the vibration-transmitting tablet 8 proceeds, taking the time tg according to the distance between the vibration-input point and the vibration sensor 6a, and is detected by the vibration sensor 6a. The signal 42 shown in FIG. 4 shows a signal waveform detected by the vibration sensor 6a. Since vibration used in this embodiment is a plate wave, the relation between an envelope 43 and the phase 42 of the detected waveform changes during vibration transmission with respect to the propagation distance on the vibration-transmitting tablet, in correspondence with the transmission distance. It is defined herein that the velocity of propagation of the envelope 43, i.e. group velocity, is Vg, and the velocity of propagation of the phase 42, i.e. phase velocity, is Vp. If the group velocity Vg and phase velocity Vp are known, the distance between the vibration-input pen 3 and the vibration sensor 6a can be obtained based on the vibration transmission time.

Regarding the envelope 43, velocity of the envelope 43 is Vg. If a particular point on a waveform, e.g. an initial zero-crossing point of a signal 44, obtained by twice differentiating the envelope 43, is detected as an inflection point of the envelope 43, the distance d between the vibration-input pen 3 and vibration sensor 6a is obtained by the following equation:

$$d = Vg \cdot tg \quad (1)$$

where tg indicates vibration transmission time (group delay time). Although equation (1) relates to the vibration sensor 6a, the respective distances from the three vibration sensors 6b–6d to the vibration-input pen 3 can be expressed by the same equation. Note that in equation (1), the vibration transmission time (group delay time) tg is obtained by subtracting an error time, caused by circuits or the like, from an actual-clocked vibration transmission time (group delay time) tg' obtained from the signal 45. Such delay time (vibration transmission time) is constant for each apparatus as will be described later, thus may be stored in the flash ROM 31d at the time of shipping the apparatus.

To determine the coordinates value of the vibration-input position with even higher precision, processing based on the detection of the phase signal is performed. Herein, the time between a vibration-applied point and a particular detection point on the phase waveform signal 42 is defined as tp'. The particular detection point herein is the point at which the waveform signal 42 first reaches the zero-crossing point after the envelope signal 43 exceeds a predetermined signal level 431. The actual-clocked vibration transmission time (phase delay time) tp' is obtained from the signal 47. The signal 47 is obtained by, for instance, generating a gate signal 46, having a predetermined width, at the timing at which the envelope 43 exceeds the predetermined signal level 431, and comparing the generated signal with the phase signal 42. Herein, assuming that a vibration transmission time (phase delay time) is tp, the distance d between the vibration sensor and vibration-input pen is obtained by the following equation:

$$d = n \cdot \lambda p + Vp \cdot tp \quad (2)$$

Herein, the vibration transmission time (phase delay time) tp is obtained by subtracting an error time, caused by circuits or the like, from the actual-clocked vibration transmission time tp'. λp is a wavelength of the elastic wave, and n is an integer.

From the foregoing equations (1) and (2), the integer n is expressed by the following equation:

$$n=int[(Vg \cdot tg - Vp \cdot tp)/\lambda p + 1/N] \qquad (3)$$

Herein, N is an appropriate real number other than 0. For instance, if N=2.0, the value of n in equation (2) can be correctly determined even if the detected value tg or tp has an error within ±½ wavelength. By substituting the value n obtained in the foregoing manner into equation (2), the distance between the vibration-input pen 3 and vibration sensor 6a can be obtained with high precision.

Figure 5:
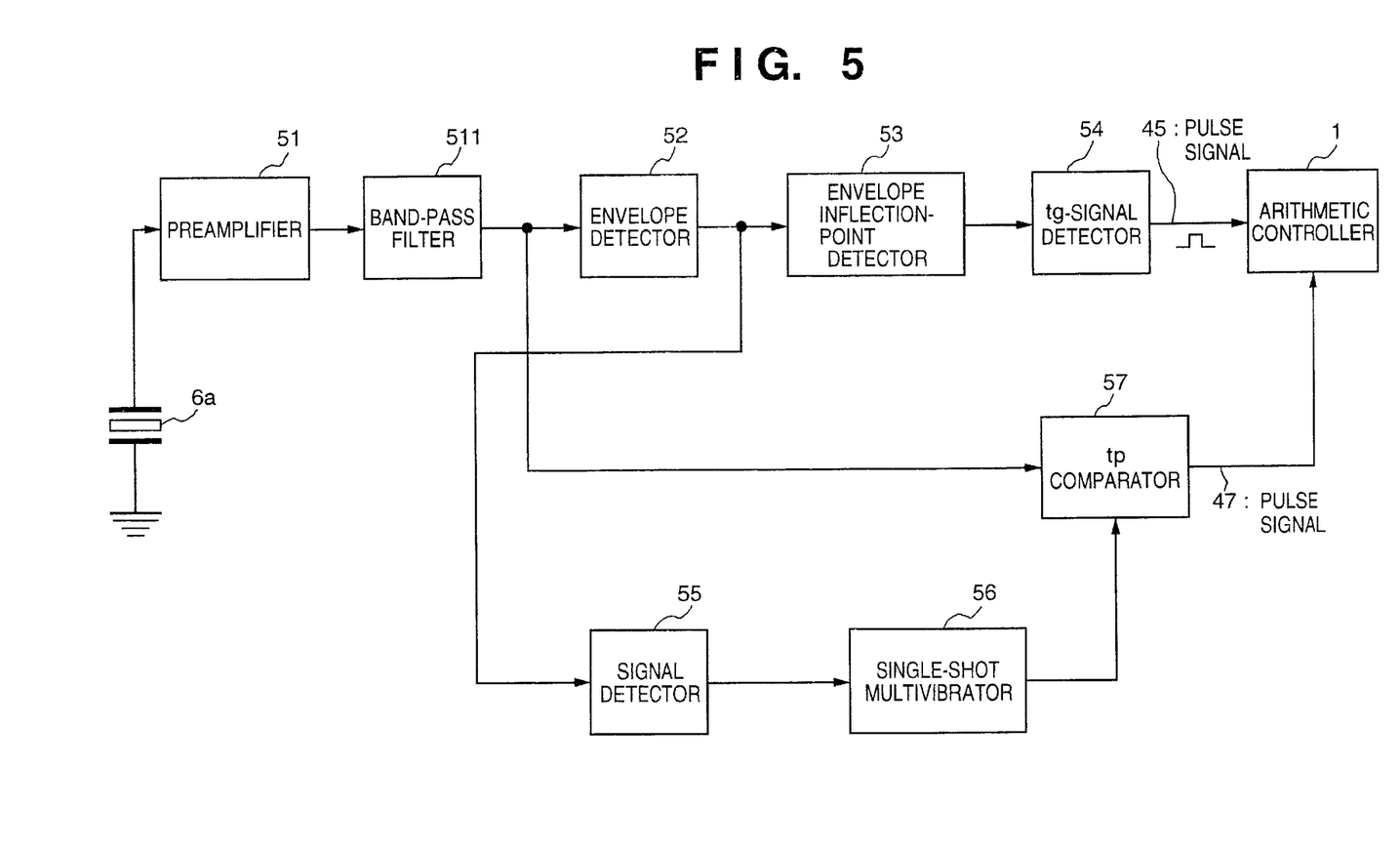
FIG. 5 is a block diagram showing the construction of the signal waveform detector 9 serving as the coordinates input apparatus according to the present embodiment.

For clocking the aforementioned actual-clocked vibration transmission time tg' and tp', the signal waveform detector 9 which generates signals 45 and 47 is configured as shown in FIG. 5.

FIG. 5 is a block diagram showing the construction of the signal waveform detector 9 serving as the coordinates input apparatus according to the present embodiment. In FIG. 5, an output signal of the vibration sensor 6a is amplified by a preamplifier 51 at a predetermined amplification rate. Then, unnecessary frequency components are eliminated from the detected signal by a band-pass filter 511. Then, the signal where unnecessary frequency components have been eliminated is inputted to an envelope detector 52 comprising an absolute signal generator, low-pass filter and the like, where only the envelope of the detected signal is extracted. Timing of an envelope inflection point is detected by an envelope inflection-point detector 53. The signal detected by the envelope inflection-point detector 53 is inputted to a tg-signal detector 54 comprising a mono-multivibrator and the like. The tg-signal detector 54 forms the signal tg' (signal 45 in FIG. 4), serving as an envelope-delay-time detection signal having a predetermined waveform, based on the inputted signal and outputs the formed signal to the arithmetic controller 1.

A signal detector 55 outputs a pulse signal indicating the timing at which the envelope signal 43 detected by the envelope detector 52 exceeds the threshold value signal 431 having a predetermined level. A single-shot multivibrator 56 outputs the gate signal 46 having a predetermined time width, which is triggered at the first leading edge of the pulse signal outputted by the signal detector 55. A tp-comparator 57 detects the first zero-crossing point of the leading edge of the phase signal 42 while the gate signal 46 is open, and outputs the phase delay time signal 47. By supplying the phase delay time signal 47 to the arithmetic controller 1, the phase delay time (vibration transmission time) tp' is obtained. Note that although the above-described circuits relate to the vibration sensor 6a, the same circuits are provided for other vibration sensors.

<Correcting Circuit Delay Time>

The signal waveform actually detected by the signal waveform detector 9 are the actual-clocked vibration transmission time tg' and tp' which include an offset due to error time occurred inside the vibration-input pen 3 or within circuits. However, in order to substitute the values into equations (2) and (3), tg and tp indicative of the net delay time (real transmission time), where offset is deducted, must be obtained.

The vibration transmission time latched by the aforementioned latch circuits 34a to 34d includes circuit delay time et and phase offset time toff. The amount of errors generated thereby is always the same when vibration is transmitted from the vibration-input pen 3 to the vibration-transmitting tablet 8 and further to the vibration sensors 6a to 6d.

Figure 6:
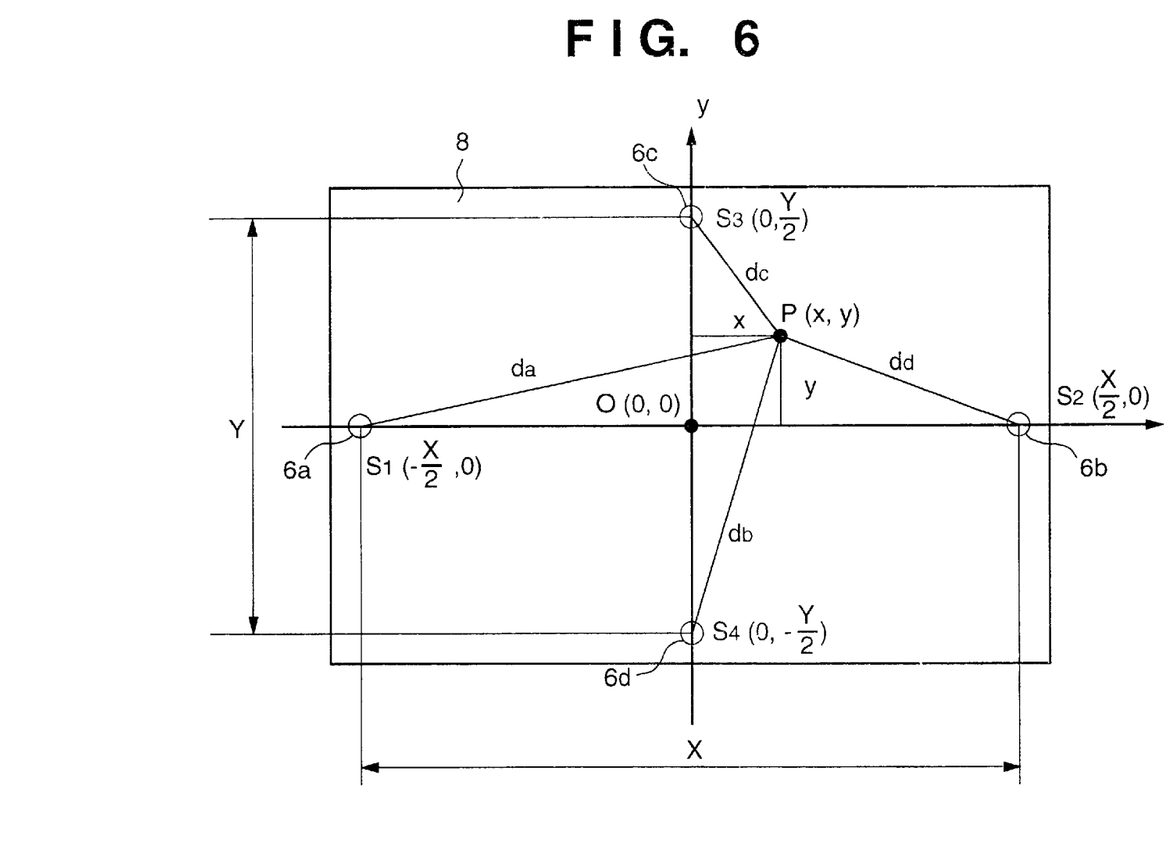
FIG. 6 shows the arrangement of a vibration-transmitting tablet and vibration sensors.

FIG. 6 shows an arrangement of the vibration-transmitting tablet 8 and vibration sensors 6a to 6d. In FIG. 6, assuming that the distance from the origin O to the vibration sensor e.g., 6a, is R (=X/2); the actual-clocked transmission time from the origin O, where vibration-input pen 3 inputs vibration, to the vibration sensor 6a is tgz' and tpz'; and the real transmission time from the origin O to the vibration sensor 6a is tgz and tpz, the above elements have the following relation with respect to the circuit delay time et and phase offset time toff:

$$tgz'=tgz+et \qquad (4)$$

$$tpz'=tpz+et+toff \qquad (5)$$

Herein, the phase offset is the deviation of the phase generated when the distance between the vibration-input pen and the vibration sensor is 0.

Meanwhile, the values of the actual-clocked vibration transmission time tg' and tp' obtained by detecting the vibration inputted at an arbitrary input point P by the vibration sensor 6a is similarly expressed by the following equation:

$$tg'=tg+et \qquad (6)$$

$$tp'=tp+et+toff \qquad (7)$$

Based on the above equations (4), (5), (6) and (7), the differences between tg' and tgz', and tp' and tpz' are respectively obtained by the following equations.

$$tg'-tgz'=(tg+et)-(tgz+et)=tg-tgz \qquad (8)$$

$$tp'-tpz'=(tp'+et+toff)-(tpz+et+toff)=tp-tpz \qquad (9)$$

By the above equations, the circuit delay time et and phase offset toff, included in each transmission time, are eliminated. As a result, the difference of the real transmission delay time in correspondence to the distance from the origin O to the input point P, with the position of the sensor 6a as the starting point, can be obtained. Therefore, equations (2) and (3) enable to obtain the correct difference between the distance from the origin O to the vibration sensor 6a and the distance from the input point P to the vibration sensor 6a.

Since the distance from the vibration sensor 6a to the origin O is known, the distance may be stored in advance in a non-volatile memory (e.g. flash ROM 31d) or the like. By this, the distance between the vibration-input pen 3 and vibration sensor 6a can be determined. The distances of other vibration sensors 6b to 6d can be obtained similarly.

The values of the actual-clocked vibration transmission time tgz' and tpz' from the origin O are stored in the non-volatile memory at the time of assembling the apparatus in a factory or at the time of shipping the apparatus. Equations (8) and (9) are executed before executing equations (2) and (3) for measuring with higher precision.

<Calculating Coordinates Position (FIG. 6)>

FIG. 6 is an explanatory view showing the arrangement of the vibration-transmitting tablet and vibration sensors. Hereinafter, the principle of obtaining a coordinates value of the vibration-input position of the vibration-input pen 3 on the vibration-transmitting tablet 8 will be described with reference to FIG. 6. Herein, it is assumed that the four vibration sensors 6a to 6d are provided at the positions defined by the coordinates S1 to S4, which are in the neighborhood of the midpoint of the four sides on the vibration-transmitting tablet 8. Based on the above-described principle, each of the distances of the straight lines da, db, dc and dd, i.e. from the vibration-input position P of the vibration-input pen 3 to each of the vibration sensors 6a to 6d, can be obtained. Based on the obtained distances of the straight lines da to dd, the arithmetic controller 1 obtains the value of coordinates (x, y) of the position P of the vibration-input pen P, utilizing the following equation which employs the Pythagorean theorem:

$$x=(da+db)\cdot(da-db)/2X \quad (10)$$

$$y=(dc+dd)\cdot(dc-dd)/2Y \quad (11)$$

Herein, X indicates the distance between the vibration sensors 6a and 6b, and Y indicates the distance between the vibration sensors 6c and 6d.

With respect to the aforementioned equations (2) and (3), in order to calculate the distances, values must be set for Vg, Vp and λp (=Vp/f) (f is a vibration frequency), respectively corresponding to group velocity, phase velocity and wavelength. As disclosed in, for instance, Japanese Patent Application Laid-Open No. 7-160407, conventionally the value of Vp corresponding to phase velocity is set based on f which is calculated from a plurality of phase delay times tp of detected vibration, and the thickness of the vibration-transmitting tablet 8; Vg corresponding to group velocity is set based on the thickness of the vibration-transmitting tablet 8; and λp is set based on the obtained f and Vp. The set Vg, Vp and λp (=Vp/f) are stored in a non-volatile memory or the like. Note that the above-mentioned plurality of phase delay times tp correspond to plural zero-crossing points (crossing points between the gate signal 46 and phase waveform signal 42 in FIG. 4) of a detected waveform in single detection operation. One cycle is calculated from the differences between the plural zero-crossing points of the leading edge, and inverse number thereof is obtained as the vibration frequency f. Moreover, the thickness of the vibration-transmitting tablet 8 may be the thickness of the substrate only or the thickness including film. In either cases, the relation between the thickness and velocity must be obtained in advance.

In the above-described manner, the coordinates position of the vibration-input pen 3 can be detected in real time.

<Construction of Vibration-Transmitting Tablet (FIG. 7)>

Figure 7:
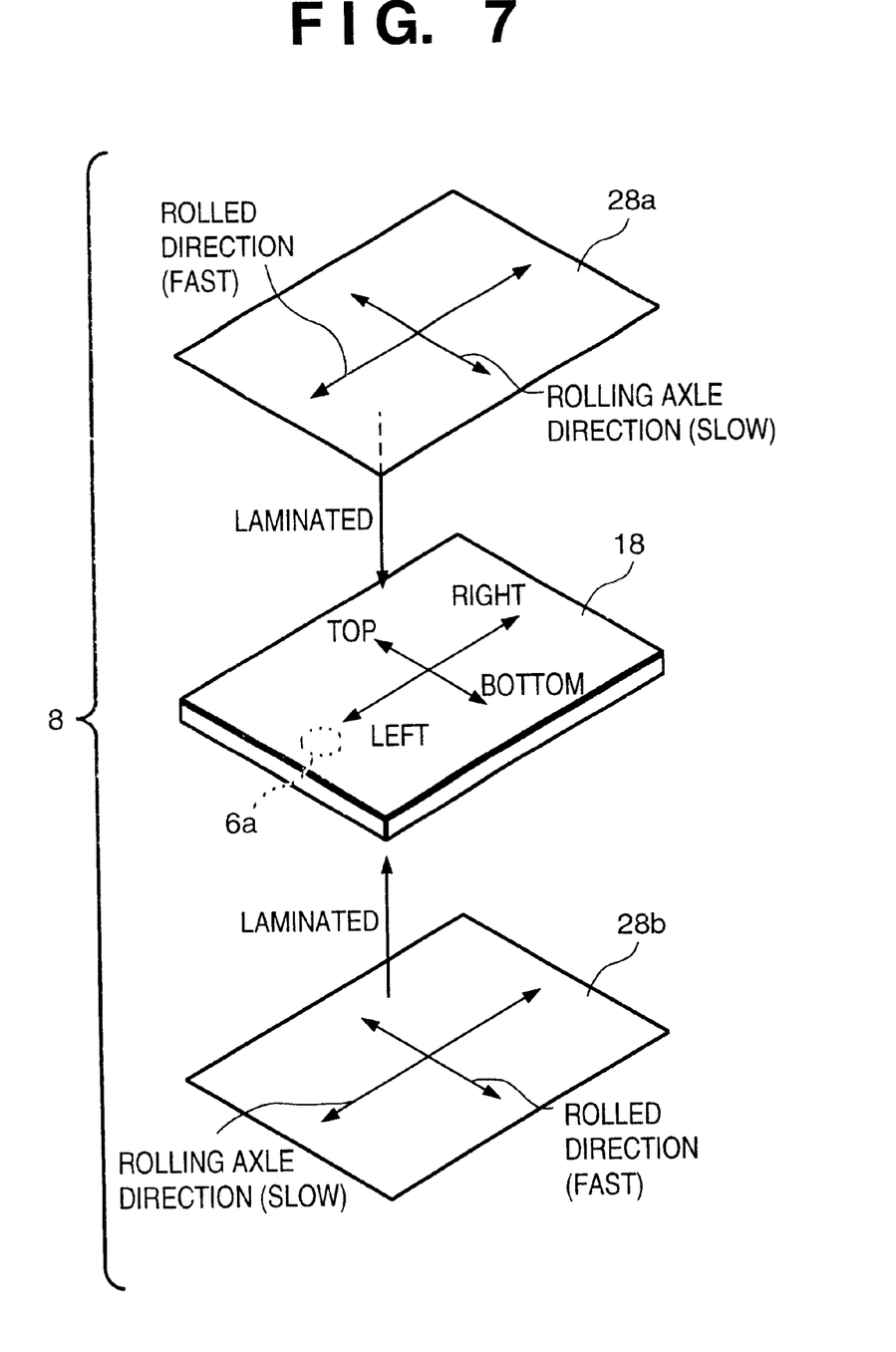
FIG. 7 is an explanatory view showing the construction of the vibration-transmitting tablet according to the present embodiment.

FIG. 7 is an explanatory view showing the construction of the vibration-transmitting tablet according to the present embodiment. As shown in FIG. 7, according to the vibration-transmitting tablet 8 of the present embodiment, polyethylene terephthalate film 28a and 28b having 0.1 mm thickness are laminated as a resinous film on both surfaces of the front and back sides of a soda lime glass having 2 mm thickness serving as a glass plate 18. The polyethylene terephthalate film 28a and 28b are formed by substantially orthogonal biaxial stretching. By virtue of the biaxial orientation, a strong film which is thermally stable and has little shrinkage can be provided. The polyethylene terephthalate film 28a and 28b (hereinafter simply referred to as film 28a and 28b) have different elasticity depending on the stretched axial directions. Taking a rolled film as an example, assuming that the film-rolled direction is one of the film-stretched axes and the axle direction of the rolled film (rolling axle direction) is the other film-stretched axis, the propagation velocity of a plate wave which proceeds in the film-rolled direction is faster than that of a plate wave which proceeds in the rolling axle direction.

In the present embodiment, the front surface film 28a and the back surface film 28b are laminated in an orientation such that the respective film-stretched directions are different substantially 90 degrees. Herein, if the vertical and horizontal directions of the glass plate 18 are defined as similar to FIG. 7, the rolled direction of the front surface film 28a corresponds to the left-right direction of the glass plate 18, and the rolled direction of the back surface film 28b corresponds to the top-bottom direction of the glass plate 18. Taking the vibration sensor 6a for example, if a plate wave is propagated from the right of the vibration sensor 6a, the degree of slowing down the propagation velocity of the plate wave is small on the front surface film 28a, while the degree of slowing down the propagation velocity is large on the back surface film 28b. Accordingly, taking into account of the degree of slowing down the propagation velocity on both surfaces of the film 28a and 28b, the propagation velocity of the plate wave propagated from the right of the vibration sensor 6a slows down with a relatively averaged degree. In addition, if a plate wave is propagated from the upper portion of the vibration sensor 6a, the degree of slowing down the propagation velocity of the plate wave is large on the front surface film 28a, while the degree of slowing down the propagation velocity is small on the back surface film 28b. Accordingly, taking into account of the degree of slowing down the propagation velocity on both surfaces of the film 28a and 28b, the propagation velocity of the plate wave propagated from the upper portion of the vibration sensor 6a slows down with a relatively averaged degree. The above description applies to waves propagated from any other directions.

As set forth above, by virtue of the construction where sheets of film are laminated in an orientation such that the film-stretched directions are substantially 90 degrees different between the front surface and the back surface, it is possible to provide the vibration-transmitting tablet 8 where vibration propagation velocity does not vary even if a plate wave is propagated from various directions. Accordingly, it is possible to realize a coordinates input apparatus, where errors occurred in measuring the distance between the vibration-input pen and vibration sensor are minimized, and which can calculate coordinates values with high precision. Furthermore, even if the glass plate breaks, the film is not damaged. Therefore, the broken pieces of glass are kept within the sheets of film, preventing them from being scattered. Moreover, even if the glass breaks, it is safe since the film prevents an operator from touching the broken pieces of glass.

Note that the substrate of the vibration-transmitting tablet, the material and thickness of the film, are not limited to the above-described embodiment. The present invention is quite effective in a case of utilizing film having different mechanical characteristics depending on directions of the sheet of film due to stretching processing or other manufacturing methods.

Furthermore, in the above-described embodiment, the sheets of film are laminated on both surfaces of the glass plate. However, two or more sheets of film may be laminated on either surface of the glass plate, i.e. only on the front surface or on the back surface, while turning the film substantially 90 degrees, to realize the vibration-transmitting tablet according to the present embodiment where vibration propagation velocity does not vary depending on the vibration propagation directions. Note that the effect of turning the laminating direction is larger in the case of laminating both surfaces of the glass plate than the case of laminating only one surface of the glass plate. This is due to the fact that the two sheets of film are directly laminated on the glass. Note that in the case of laminating both surfaces of the glass plate with the film, one of the film surfaces is used as an input surface. Therefore, hard-coating processing is necessary for preventing scratches on the film surface.

Moreover, material of the sheets of film laminated on both or one of the surfaces of the glass plate do not have to be the same material. For instance, a polycarbonate film and chloroethylene film may be laminated respectively on the front surface and back surface. The main point is to laminate sheets of film on the vibration-transmitting tablet while turning the film in such an orientation that the vibration propagation velocity does not vary depending on the vibration propagation directions, while taking into consideration of the mechanical characteristics of each film (axial characteristics). For instance, in a case of laminating sheets of film on both surfaces of the vibration-transmitting tablet, specifications required for the film are different e.g., hard-coating processing needs to be performed on the input surface of the film. By utilizing two sheets of film having different specifications (e.g. different material), required specifications, including cost, can be optimized.

Note that in the above example, since the front surface (input surface) is laminated with polycarbonate film and the back surface is laminated with chloroethylene film, the vibration propagation velocity differs due to the difference in the materials. In general, taking film of the same material for example, the larger the thickness of the film, the slower the propagation speed. Therefore, if the thickness of the film is adjusted, even if a different film material is used, the vibration propagation velocity characteristic may be considered as if they are the same material. Even in a case where plural sheets of film of different materials are laminated on the vibration-transmitting tablet, the above feature may be applied. By adjusting the thickness of the film, the characteristics of the vibration propagation velocity of both sheets of film can be made equal. Accordingly, lamination can be optimized by, for instance, laminating the front surface of the vibration-transmitting tablet with expensive film (polycarbonate film) which is less likely to be scratched, and laminating the back surface with inexpensive film (chloroethylene film), as described above.

Moreover, in a case where hard-coating processing is performed on the input surface of the vibration-transmitting tablet, strictly speaking, the vibration propagation velocity changes. However, since the thickness of the hard coating is 2–5 μm and the thickness of the film is tens-hundreds μm, the influence of the hard coating may be ignored.

Furthermore, the difference in film directions is not limited to 90 degrees, but sheets of film are laminated so that the mechanical characteristic of the film in one axis (direction) compensates the other characteristic in the other axis (direction). For instance, four sheets of film may be laminated while turning the laminating direction 45 degrees.

In a case where the aforementioned vibration-transmitting tablet is assembled with a display such as an LCD or the like, glare-proof processing or reflection reduction processing is sometimes performed on the front or back surface of the vibration-transmitting tablet for a better view. In the present embodiment, any processing may be performed on the surface of the film used for laminating the vibration-transmitting tablet.

As has been described above, according to the present embodiment, since plural sheets of resinous film are laminated with different orientations (stretched directions) of the film, the propagation velocity is not dependent on the vibration propagation directions. Accordingly, a coordinates input apparatus having high-precision characteristics can be realized.

Moreover, by laminating the vibration-transmitting tablet with two sheets of resinous film in different orientations (stretched directions) of the film, it is possible to realize a coordinates input apparatus having a simple construction, which includes the vibration-transmitting tablet formed with a glass plate, laminated with resinous film for preventing glass scattering, and laminated in an orientation such that propagation velocity does not vary depending on the vibration propagation directions.

Furthermore, by virtue of the construction where the first and second sheets of resinous film are laminated in an orientation such that the film-stretched directions are turned substantially 90 degrees, it is possible to efficiently realize the construction where propagation velocity does not vary depending on the vibration propagation directions. Accordingly, it is possible to realize a coordinates input apparatus having high-precision characteristics with low cost.

Note that the present invention can be applied to a system constituted by a plurality of devices (e.g. host computer, interface unit, reader, printer and the like) or to an apparatus comprising a single device (e.g. copy machine, facsimile apparatus and the like).

As has been set forth above, according to the present invention, laminating a glass plate of the vibration-transmitting tablet with a protection film enables to minimize changes in propagation velocity of vibration propagated from various directions.

The present invention is not limited to the above embodiments and various changes and modifications can be made within the spirit and scope of the present invention. Therefore, to appraise the public of the scope of the present invention, the following claims are made.

What is claimed is:

1. A vibration-transmitting tablet for propagating inputted vibration, comprising:
   a substrate; and
   a plurality of films laminated on said substrate,
   wherein each of said plurality of films is laminated in an orientation such that for each film a direction of propagation velocity character of vibration, which is horizontal to a surface of said vibration-transmitting tablet, is different from another of said plurality of films by substantially 90 degrees, so as to compensate for the propagation velocity character of vibration of the other and equalize the progagation velocity in every direction.

2. The vibration-transmitting tablet according to claim 1, wherein stretch processing is performed on said plurality of films, and said plurality of films are laminated such that the direction of the stretches cross by 90 degrees.

3. The vibration-transmitting tablet according to claim 1, wherein said plurality of films include a first film and a second film, and said first film is laminated on one of the surfaces of said substrate and said second film is laminated on the other surface of said substrate.

4. The vibration-transmitting tablet according to claim 1, wherein said plurality of films include a first film and a second film, and said first and second films are laminated on one of the surfaces of said substrate.

5. The vibration-transmitting tablet according to claim 1, wherein said plurality of films includes a first film and a second film, substantial-orthogonal biaxial stretch processing is performed on said first and second films, and said first and second films are laminated such that stretched directions differ from each other by substantially 90 degrees.

6. The vibration-transmitting tablet according to claim 1, wherein said plurality of films are made of different materials.

7. The vibration-transmitting tablet according to claim 1, wherein said substrate is a glass plate.

8. A coordinates input apparatus for detecting vibration, inputted by vibration-input means, by a plurality of vibration sensors provided on a vibration-transmitting tablet, and deriving coordinates of a vibration-input point based on vibration transmitting time on the vibration-transmitting tablet, said vibration-transmitting tablet comprising:

a substrate; and a plurality of films laminated on said substrate, wherein each of said plurality of films is laminated in an orientation such that for each film a direction of propagation velocity character of vibration, which is horizontal to a surface of said vibration-transmitting tablet, is different from another of said plurality of films by substantially 90 degrees, so as to compensate for the propagation velocity character of vibration of the other and equalize the propagation velocity in every direction.

9. The coordinates input apparatus according to claim 8, wherein stretch processing is performed on said plurality of films, and said plurality of films are laminated such that the directions of the stretches cross by 90 degrees.

10. The coordinates input apparatus according to claim 8, wherein said plurality of films include a first film and a second film, and said first film is laminated on one of the surfaces of said substrate and said second film is laminated on the other surface of said substrate.

11. The coordinates input apparatus according to claim 8, wherein said plurality of films include a first film and a second film, and said first and second films are laminated on one of the surfaces of said substrate.

12. The coordinates input apparatus according to claim 8, wherein said plurality of films include a first film and a second film, substantial-orthogonal biaxial stretch processing is performed on said first and second films, and said first and second films are laminated such that stretched directions differ from each other by substantially 90 degrees.

13. The coordinates input apparatus according to claim 8, wherein said plurality of films are made of different materials.

14. The coordinates input apparatus according to claim 8, wherein said substrate is a glass plate.

* * * * *

UNITED STATES PATENT AND TRADEMARK OFFICE
CERTIFICATE OF CORRECTION

PATENT NO.    : 6,407,731 B2
DATED         : June 18, 2002
INVENTOR(S)   : Yanagisawa et al.

It is certified that error appears in the above-identified patent and that said Letters Patent is hereby corrected as shown below:

Column 2,
Line 45, "such" should read -- such a --.

Column 9,
Line 28, "in" should read -- in a --;
Line 44, "film" should read -- films --;
Line 48, "film" should read -- films --;
Line 51, "film" should read -- films --; and
Line 52, "film" should read -- films --.

Column 10,
Line 10, "film" should read -- films --; and
Line 20, "film" should read -- films --.

Signed and Sealed this

Thirty-first Day of December, 2002

JAMES E. ROGAN
*Director of the United States Patent and Trademark Office*